Dec. 13, 1966 M. F. SMITH 3,291,631
TECHNIQUE FOR COATING ARTICLES USING STREAMS
OF PARTICLES IN LAMINAR FLOW
Filed Feb. 1, 1963 4 Sheets-Sheet 1
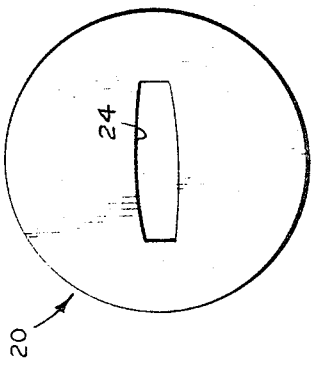
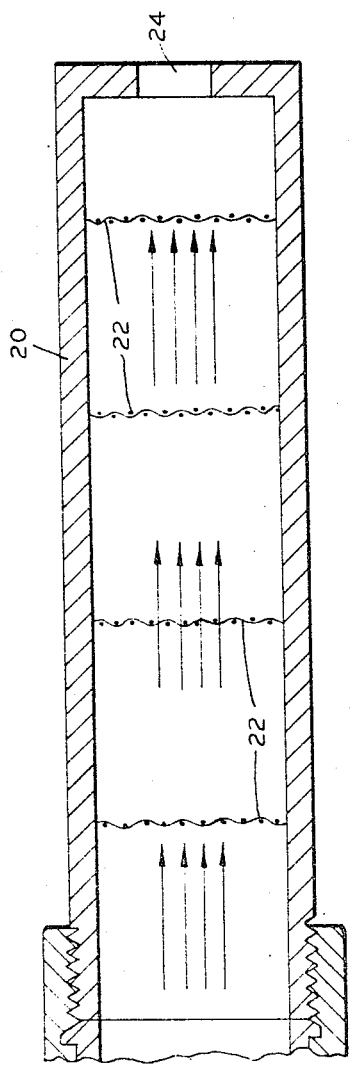
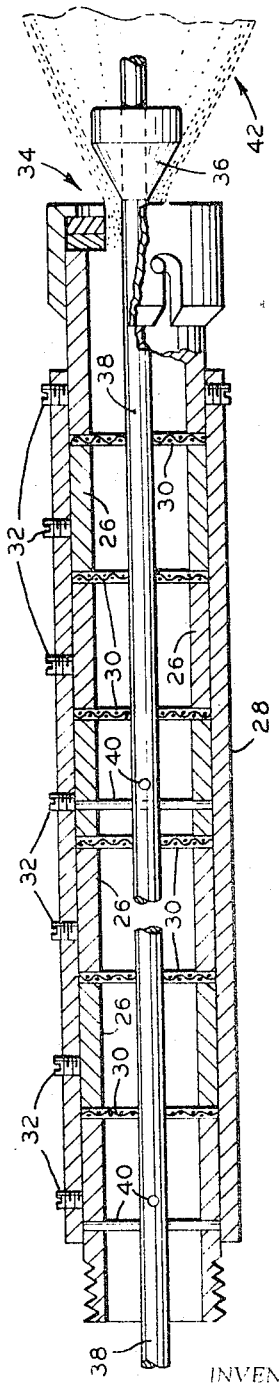
INVENTOR.
MILLARD F. SMITH
BY
*Blair and Buckles*
ATTORNEYS.

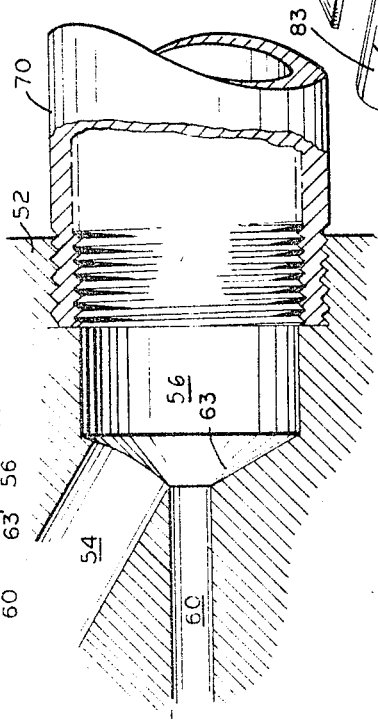

Dec. 13, 1966    M. F. SMITH    3,291,631
TECHNIQUE FOR COATING ARTICLES USING STREAMS
OF PARTICLES IN LAMINAR FLOW
Filed Feb. 1, 1963                                    4 Sheets-Sheet 3
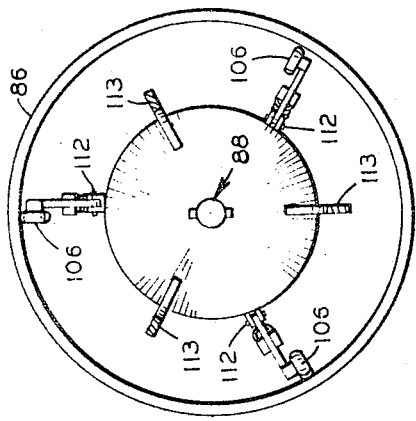
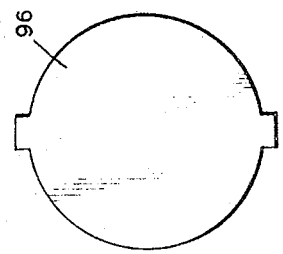
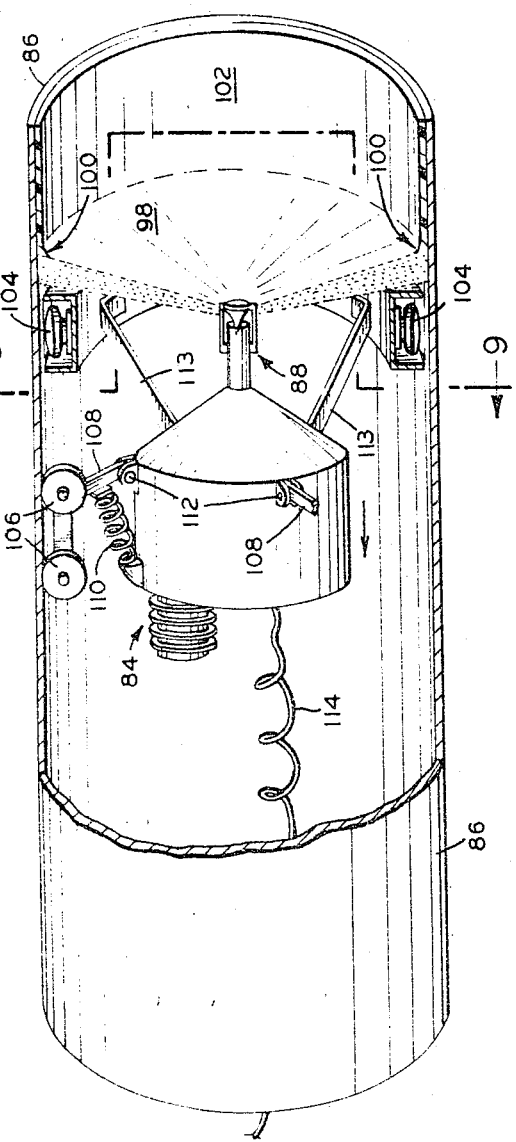
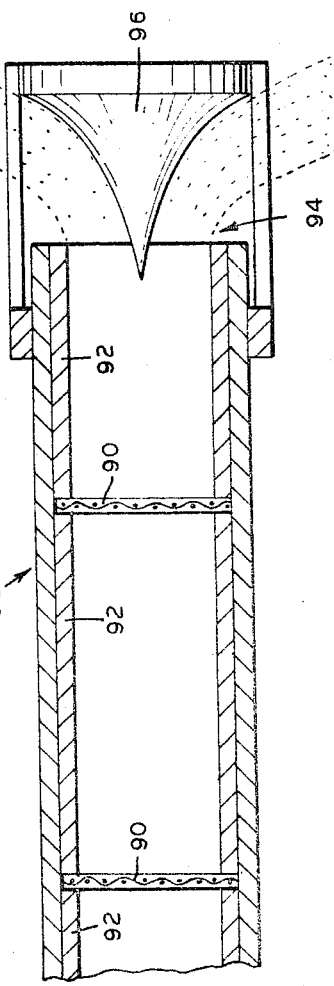
INVENTOR.
MILLARD F. SMITH
BY
*Blair and Buckles*
ATTORNEYS.

Dec. 13, 1966     M. F. SMITH     3,291,631
TECHNIQUE FOR COATING ARTICLES USING STREAMS
OF PARTICLES IN LAMINAR FLOW
Filed Feb. 1, 1963     4 Sheets-Sheet 4

INVENTOR.
MILLARD F. SMITH
BY
Blair and Buckles
ATTORNEYS.

United States Patent Office

3,291,631
Patented Dec. 13, 1966

3,291,631
TECHNIQUE FOR COATING ARTICLES USING STREAMS OF PARTICLES IN LAMINAR FLOW
Millard F. Smith, Westport, Conn. (% Neirad Industries, Inc., P.O. Box 295, Saugatuck, Conn.)
Filed Feb. 1, 1963, Ser. No. 255,601
6 Claims. (Cl. 117—19)

The present application is a continuation-in-part of my application Serial No. 110,581, filed May 16, 1961 for "Sheet Forming," and my application Serial No. 146,828, filed October 23, 1961, for "Coating Technique and Apparatus Therefor." Both applications have been abandoned.

This invention relates to apparatus and techniques for coating objects having a wide variety of shapes, such as cylinders, continuous wires, tubes and containers. The present invention produces coatings of uniform thickness and smooth surface. Furthermore, coatings of one or several colors in stripes or patterns may be applied to this wide variety of objects. Moreover, the edges of these coatings may be sharply delineated from the adjacent uncoated areas of the object.

Examples of prior art techniques for applying plastic coatings to metal articles are described in Heisler Patent 2,736,925 and Engle Patent 2,915,788. These prior art techniques permit powdered plastic material to be formed into coatings on objects only through the use of bulky, heavy and awkward apparatus, generally requiring large quantities of the powdered plastic material to be held in position adjacent the article to be coated for a substantial period of time, and often requiring a series of heating, coating and cooling steps to build up adequate coatings. The awkward and clumsy tanks and apparatus of the prior art are useful only for single unit or small batch coating operations, and cannot be employed for continuous production line coating of large quantities of articles. Furthermore, they allow very little control over the uniformity, smoothness or thickness of the coatings.

Accordingly, it is a principal object of the present invention to provide methods and apparatus for applying coatings of uniform thickness, smoothness and continuity to objects of various shapes.

Another object of the invention is to provide methods and apparatus of the above character for applying coatings to variously-shaped objects in continuous production line operations.

A further object of the invention is to provide methods and apparatus of the above character for applying sharply delineated coatings to objects of various shapes while leaving neighboring regions of such objects uncoated.

Another object of the invention is to provide methods and apparatus of the above character for projecting powdered plastic material toward the object to be coated in a flowing stream of air or other gas, taking advantage of substantially laminar flow characteristics in the flowing stream to maintain the uniform predictability of the resulting coatings.

A further object of the invention is to provide methods and apparatus of the above character incorporating projecting guns having flow straightening screens producing substantially laminar flow characteristics in the flowing stream of gas carrying the powdered plastic material toward the object to be coated.

Another object of the invention is to provide methods and apparatus of the above character incorporating flow diverting surfaces cooperating with laminar flow inducing projecting guns and adapted to divert and direct the flowing stream of gas carrying the powdered plastic material toward various portions of the object to be coated.

A further object of the invention is to provide methods and apparatus of the above character incorporating automatic feed devices providing relative motion between the plastic projecting apparatus and the object to be coated whereby continuous coatings may be applied over a large area of the coated object.

Other objects of the invention will in part be obvious and will in part appear hereinafter.

The invention accordingly comprises the several steps and the relation of one or more of such steps with respect to each of the others and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIGURE 1 is a cross-sectional side elevation view showing a laminar flow inducing stream-projecting gun employed in one embodiment of the present invention;

FIGURE 2 is an end elevation view of the stream-projecting gun of FIGURE 1;

FIGURE 3 is a cross-sectional side elevation view showing a different form of laminar flow inducing stream-projecting gun employed in another embodiment of the present invention;

FIGURE 4 is a cross-sectional side elevation view of an air-powder mixing chamber and stream-projecting gun employed in a different embodiment of the invention;

FIGURE 5 is an end elevation view of the device shown in FIGURE 4;

FIGURE 6 is an enlarged fragmentary cross-sectional side elevation view of the air-powder mixing chamber employed in one form of the present invention;

FIGURE 7 is a fragmentary diagrammatic perspective view showing the stream projection system, the powder coating operation and the powder recovery devices in one embodiment of the invention.

FIGURE 8 is a side elevation view, partially broken away, showing a self-contained projecting unit employed in coating the inner surface of a pipe;

FIGURE 9 is a cross-sectional end elevation view of the pipe and coating unit of FIGURE 8.

FIGURE 10 is an enlarged fragmentary cross-sectional side elevation view of the stream-projecting gun incorporated in the unit shown in FIGURE 8;

FIGURE 11 is an end elevation view of the stream-projecting gun device shown in FIGURE 10;

Similar reference characters refer to similar parts throughout the several views of the drawings.

Figure 12:
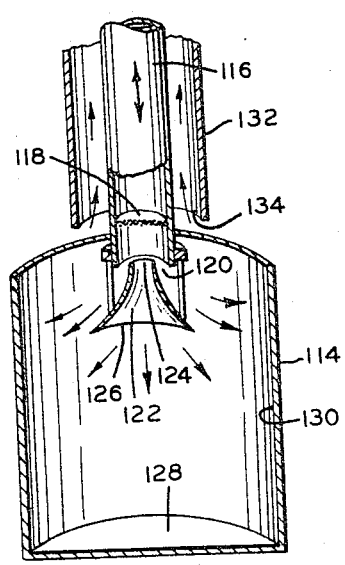
FIGURE 12 is a cross-sectional side perspective view of a container coating apparatus of the present invention.

The apparatus of this invention includes the combination of a supply reservoir of powdered coating material, a source of compressed air, and a projecting gun where the powdered coating material is thoroughly mixed with a stream of compressed air which is then directed toward the surface to be coated. A vacuum exhaust hood is preferably positioned to collect and return the excess coating powder to the supply reservoir, avoiding waste and minimizing the total volume of coating powder required, even when a series of objects is coated in a continuous production line coating operation.

In the coating techniques of the invention, the powdered coating material, generally a thermosetting resin such as polyethylene or polyvinyl chloride, is projected toward a heated surface of the object to be coated in a flowing stream of air or other gas which exhibits laminar flow characteristics. Thus the particles of coating material are carried toward the surface to be coated along generally parallel streamlines of the flowing air stream. Pressure and velocity of the particles is substantially constant at all points across the stream, resulting in a high degree of control over the path and the lateral limits of the stream of powdered coating material. Sharply delineated coating areas are thus achieved, together with predictable uniformity and smoothness of the resulting coatings.

The powdered coating material, which may range in particle size from sub-micron sizes up to 250 microns in diameter, is introduced to the flowing air stream at a velocity-reduction point, such as the abruptly widening region of a Venturi section of the conduit conveying the stream of air toward the coated object. This produces thorough mixing of the powdered coating material in the air stream, which then passes through a projecting tube or gun incorporating serially-arrayed flow-straightening members which induce the desired laminar flow characteristics, such as the screens shown in FIGURES 1, 3 and 4, for example.

The flowing stream may be constrained at the outlet end of the projecting gun as shown in FIGURE 1; it may be diverted laterally as shown in FIGURES 3, 10, 12 and 13; or it may be unconstrained as shown in FIGURES 4 and 5. In each case the flowing stream of air carrying the powdered coating material is projected toward the surface of the object to be coated, which is preferably preheated by adjacent electrical heating elements as in FIGURE 7, by induction heating coils or by such means as the radiant heating units shown in FIGURE 8. These heating elements bring the coated surface to a temperature at which the impinging powdered coating material will adhere and fuse thereto.

Relative motion between the impinging stream and the coated surface is generally desired, so that a continuously flowing stream can be used to coat a large area of the object's surface. Examples of coating apparatus providing such relative motion are illustrated in FIGURES 7, 8, 12, 13 and 14.

Vacuum exhaust hoods such as those shown in FIGURES 7, 12, 13 and 14 are preferably employed to direct the air stream after it deposits the powdered coating material on the surface to be coated, and they permit recycling of the coating material as well as masking and shielding of the adjacent surface areas to be left uncoated.

Among the variously shaped objects which can be coated by the techniques of this invention are sheet metal siding and shingles for exterior sheathing of homes and buildings, and such variously shaped objects as wire, rods, cylinders, cans and even the inside surfaces of pipes and containers. These novel techniques reduce waste of coating material to a minimum while producing highly uniform coatings over specific predetermined regions of the coated surface.

A schematic diagram of the laminar flow-inducing portion of a projecting gun employed in the present invention is shown in FIGURES 1 and 2. In these figures a tube 20 directs the stream of air and powdered coating material toward the coated surface, and is provided with longitudinally spaced transverse mesh screens 22 interposed in the path of the moving air stream.

The screens 22 are preferably arranged with their axes substantially parallel, and the mesh sizes of the screens are preferably selected to provide screen apertures about ten times the average diameter of the particles of coating material carried in the flowing air stream. Screens of this mesh size appear to provide optimum flow-straightening of the passing stream, while at the same time minimizing clogging or particle buildup in the screen mesh.

After the air stream carrying the powdered coating material is directed through these spaced, longitudinally arrayed transverse screens, it passes through an exit orifice 24 toward the surface of the object to be coated. As shown in FIGURE 2, the orifice 24 may be shaped to provide a particular cross sectional pattern or shape in the flowing stream issuing from the projecting gun 20.

A stream projection tube having different form of exit orifice is illustrated in FIGURE 3, and a series of internal tube segments 26 are there shown positioned inside the projecting gun 28 with the flow-straightening screens 30 being positioned between and spaced apart by the successive tube segments 26. After installation, the segments are held in position by set screws 32. In the stream projecting gun shown in FIGURE 3, the exit orifice 34 is provided with a flow diverting conical deflector 36 mounted on a central rod 38 centrally positioned along the axis of the tube 28 by supports 40. The conical surface of the deflector 36 diverts the flowing stream of air and powdered material laterally to form a thin conical sheet 42, which maintains its sheet form as it diverges, apparently by reason of mass attraction phenomena resembling the action of surface tension. Similar flow-diverting elements are shown in FIGURES 8, 10, 12 and 13, producing diverging streams of air carrying the powered coating material toward the surface to be coated.

A laminar-flow stream-projecting gun 44 is shown in FIGURE 4, incorporating an "expansion" mixing chamber 56 in which the powdered coating material is introduced into the flowing air stream as it passes toward the flow-straightening screens 62 in the connecting projecting tube 70. A funnel-shaped hopper 46 for the powdered coating material has its outlet end 48 threaded into an enlarged aperture 50 in a mixing block 52 communicating wtih a powder feed pasage 54 passing downwardly through the mixing block 52 and opening into the expansion mixing chamber 56. Compressed air from an air inlet conduit 58 is admitted to a reduced-diameter air feed passage 60 formed in the block 52 and opening into the expansion mixing chamber 56. The mixing chamber 56 is preferably formed with an internal diameter four or five times greater than the inside diameter of the air feed passage 60, and this change in diameter is achieved abruptly at the conical surface 63, which may diverge from the axis of air feed passage 60 by an angle in the neighborhood of 60°. The powder feed passage 54 opens through the conical surface 63 into the expansion mixing chamber 56, and the axis of powder feed passage 54 is preferably substantially normal to that portion of surface 63 through which it opens in the preferred embodiment of the invention fragmentarily illustrated in FIGURE 6. The abrupt change in diameter of the air feed passage 60 as it enlarges to form the expansion mixing chamber 56 produces a sharp deceleration of the moving air which apparently enhances the mixing of the powdered coating material entering the chamber 56 through the feed passage 54.

After this thorough mixing is completed, the air-powder mixture proceeds down the length of the projecting gun 44, where it passes successively through each of the axially spaced transverse screens 62. These screens are positioned at the desired axial distance by internal tubular segments 64 spaced between the screens 62. The tubular segments 64 are held in position at the exit end of the gun 44 by internal flange 66, and they are maintained in their desired axial, longitudinal spacing by the threaded lock ring 68, internally threaded into the inlet end of the tube 70, which is itself threaded into the mixing block 52 to provide the outlet passage from the expansion mixing chamber 56.

The projecting guns illustrated in FIGURES 4, 5 and 6 are employed in the external coating embodiments of the present invention in which an exterior surface of a flat sheet or a curved object is to be coated with a powdered material. In FIGURE 7, for example, a cylindrical tube 72 is rotatably held in a chuck member (not shown), and positioned in the path of the coating material stream 76. An internal heating element 74 is positioned inside the tube 72 and supplies heat to the region of the tube positioned to receive coating material in the stream 76 from the projecting gun 44.

Tests of the combination of the laminar flow projection tube 44 with the expansion-mixing chamber 56, as shown in FIGURES 4 and 6 have established the fact that unexpectedly large quantities of powdered material are drawn through the device. Prior art publications have suggested that only a 1:1 weight ratio of powder to air could be carried in a directable stream of air. With this invention, however, powder-to-air weight ratios up to 60,000:1 or greater can be achieved.

The number and alignment of the screens 62 importantly affects the rate of flow, for six screens with their axes aligned in the configuration of FIGURE 4 produce a rate of flow double that with only two screens having their axes randomly disoriented.

The laminar flow characteristics, parallel streamlines and substantially equal pressure at all points across the flowing stream 76, which is directed toward the object 72 by the projecting gun 44, provide a high degree of control over the pattern and accurate edge positioning of the coating 78 produced on the object 72. The laminar flow stream 76 avoids spraying or scattering of the powdered coating material as it travels toward the object 72, and enhances the smoothness and uniformity of the resulting coating 78, also producing sharply delineated edges 80 of the coating 78. The object 72 may be rotated once or several times while the stream of coating material 76 is impinging on it, and axial or helical motion may also be imparted to the object 72, providing longitudinally extended coated areas thereof.

The exhaust and recycling of the excess powdered coating material is achieved by a vacuum hood 82 connected by a vacuum conduit 84 to the intake of a blower (not shown). The hood 82 is positioned close to the coated object 72 in the path of the flowing stream 76. Upon removal of the object 72 after coating, vacuum hood 82 receives the entire volume of stream 76 until a new object 72 is interposed. In FIGURE 7, for example, the object 72 and its supporting assembly might be lowered away from stream 76 to permit insertion of a new object 72 for the next coating operation.

Powdered coating material drawn into hood 82 and through conduit 84 by the blower is thence returned to a powder storage station, such as the supply hopper 46, ready for recycling.

In one alternative embodiment of the invention, automatic conveying and loading apparatus is employed to bring the object 72 into position for the coating operation. In this embodiment an intermittent timed jet of compressed air from a nozzle 77 deflects the stream 76 away from the object 72 and toward the vacuum hood 82 during the shifting operation, so that the coating material in the air stream does not impinge upon the object 72 while it is removed from the coating station and a new object 72 is brought into position for coating. This diversion of the stream of coating material avoids the exposure of the uncoated areas 83 to the coating material and maintains the sharply delineated boundary line 80 between the coated area 78 and the uncoated areas 82.

A modified embodiment of the invention employed in the internal coating of pipes is illustrated in FIGURES 8–11. In this embodiment, a self-contained traveling coating unit 84 is mounted for movement down the inside of the pipe 86. The coating unit 84 is provided with a projecting gun 88 shown in the enlarged view of FIGURE 10, incorporating flow straightening screens 90 as previously described, spaced apart by internal tube segments 92, to produce laminar flow characteristics in the advancing powder-carrying air stream. The exit orifice 94 of the projecting gun 88 is provided with a lateral flow diverting and deflecting surface 96 which is illustrated as an inverted paraboloidal pyramid in FIGURE 10.

The flow-diverting surface 96 may take shapes other than parabolic curves to produce the desired stream direction over the diverging projection region 98, as shown in FIGURE 8, while producing minimum disturbance of the laminar flow characteristics of the stream. The diverging stream 98 is directed radially and uniformly toward the inner circumference of the pipe 86 around the impingement zone 100. For optimum uniformity of the resulting coating, the projecting gun 88 is preferably positioned close to the central axis of the pipe 86.

As the traveling coating unit 84 moves slowly down the inside of the pipe 86, from right to left in FIGURE 8, the impingement zone 100 correspondingly moves down the inside of the pipe, leaving a smooth uniform coating 102 solidified on the interior surface of the pipe 86.

Heating of the inner surface of the pipe 86 in a zone ahead of the advancing impingement zone 100 may be produced by external heating, but in the illustrated embodiment it is achieved by interior heating units peripherally arranged around the inner circumference of the pipe 86 just ahead of the advancing impingement zone 100, such as the ring of infrared heat lamps 104 mounted on the coating unit 84 of FIGURE 8.

The entire coating unit 84 including the heating unit 104 is movable longitudinally down the length of the pipe 86 by virtue of its wheels 106, mounted on radial supporting arms 108, which may be pivoted and resiliently urged outwardly by compression coil spring 110, pivoting around pivot pins 112. If three or more of the arms 108 and springs 110 are mounted around the periphery of the coating unit 84 as shown in FIGURE 9, and if the compression coil springs 110 are evenly or adjustably matched to provide substantially the same outward force urging the wheels 106 outwardly on all of the supporting arms 108, the coating unit 84 will be substantially self-centering as it moves down the length of pipe 86. The heating unit 104 is also supported on the movable coating unit 84 by such means as the spider arms 113.

The self-contained coating unit 84 preferably incorporates an air-compressor and a sufficient supply of powder to provide a coating 102 of suitable thickness down the entire length of the pipe 86. An extensible power cable 114 may supply the electric power needed to operate the compressor, and to power a driving motor for propelling the coating unit 84 along the length of the tube by supplying driving torque to one or more of the wheels 106.

If desired, a suction intake similar to the vacuum hood 82 of FIGURE 7 may be positioned near impingement zone 100, preferably on the same side as coating 102, to draw off any excess powdered coating material for later recycling.

The coating unit 84 shown in detail in FIGURES 8 and 9 thus provides a self-centering and self-driving assembly capable of providing a smooth, uniform layer of powdered plastic material fused to form a homogeneous coating 102 inside the pipe 86 from one end to the other. This coating technique is suitable for pipes of various sizes, for by separating the powder supply, the air compressor and the driving means from the coating unit 84 and placing them outside the pipe 86 if desired, a miniaturized coating unit 84 may thus be formed suitable for coating the insides of heated small-diameter pipes. In this unit, a small projecting gun 88 is supplied with the powder-carrying laminar flow stream of compressed air by tubing from the external source. This small gun moves down the pipe, depositing an internal coating 102 in the same manner as the larger, self-contained assembly shown in FIGURE 8. A feed screw or axially driven feed rod connected to the coating unit and powered by a feed mechanism stationed outside the pipe 86 may be employed to draw the coating unit 84 down the length of the pipe 86.

A different embodiment of the invention is shown in FIGURE 12, where an open top container 114 is shown in position at a coating station, where heat is supplied. A projecting gun 116 incorporating a series of transverse flow-straightening screens 118 is positioned for substantially axial movement into and out of the interior of the heated container 114, again projecting a powder-carrying stream of air exhibiting laminer flow characteristics toward the surface to be coated. The exit orifice 120 of the projecting gun 116 is provided with a stream-diverting horn 122 having an inverted paraboloidal shape similar to that of the flow-diverting element 96 in FIGURE 10, but provided with an open input end 124 exposed to the flowing stream proceeding down the gun 116 and connected by the expanding body portion of the element 122 to an enlarged output aperture 126.

The expanding horn shape of the deflecting horn 122 tends to spread the powdered coating material passing therethrough outwardly in diverging directions, coating primarily the bottom inside surface 128 of the container 114. The outer surfaces of the horn-shaped element 122 coact with the flowing stream in the manner illustrated in FIGURE 10 to spread the stream radially toward the inner side walls 130 of the container 114. The horn 122 has a minimum disturbing effect on the laminer-flow characteristics of the advancing powder-carrying air stream, and the divergence of the stream produces a smooth uniform coating fusing over the entire inner surface of container 114.

In the coating operation performed with the apparatus shown in FIGURE 12, a new container 114 is placed in position and exposed to heat at the coating station, and the vertically movable coating gun 116 is lowered slowly into the container 114, telescoping downwardly within it until it reaches the vicinity of the bottom 128. The coating gun 116 is then raised slowly out of the container 114.

The container 114 is heated by any suitable means, such as induction heating coils surrounding its periphery or infra-red heat lamps of the type shown in FIGURE 8, and the temperature of the bottom 128 and walls 130 of the container 114 is selected to fuse the coating material projected toward the inside surfaces of the container by the gun 116. Thus when the gun 116 is raised out of the container 114, all inner surfaces have been smoothly and uniformly coated.

A vacuum shield 132 is shaped in the form of a tube substantially concentric with the gun 116, and has an open mouth 134 positioned near the open top of the container 114. Shield 132 has its upper end connected to the inlet of a blower or vacuum pump. The resulting flow of air upwardly into the mouth 134 and up the tube 132 carries with it any excess coating powder which does not adhere to the inner surfaces 128 or 130 of the container 114. The shield 132 thus acts like the vacuum hood 82 in FIGURE 7, allowing excess coating powder to be returned to a supply, from which it may be recycled through the coating process without waste or loss of the excess coating material. In addition the shield 132 avoids the creation of back pressure or standing wave pressure barriers within the container 114 which might interfere with the laminar flow distribution of coating material toward the inner surfaces 128 and 130.

If desired, the shield 132 may be partially telescoped within the container 114 during the coating operation to minimize loss of coating material, as described below with respect to FIGURE 13.

Figure 13:
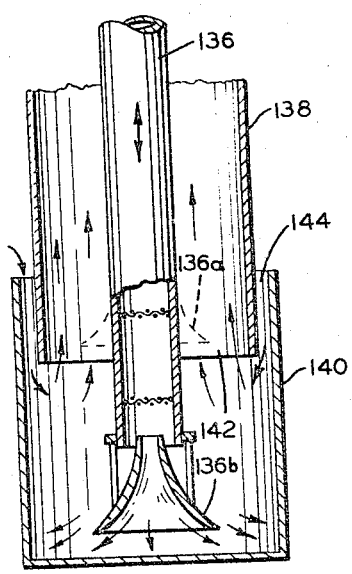
FIGURE 13 is a cross-sectional side elevation view of a modified form of the container coating apparatus in FIGURE 12.

A modified embodiment of the invention is shown in FIGURE 13, where a coating projecting gun 136 is movable upward and downward and is constructed in a manner similar to the gun 116 in FIGURE 12. In the assembly of FIGURE 13, however, a vacuum shield 138 is positioned surrounding the projecting gun 136 closely adjacent to the inner wall of the container 140 to be coated by the mechanism. A small air space 144 between the vacuum shield 138 and the inner wall of container 140 admits outside air to the container 140, where it passes into the vacuum shield 138 toward an exhaust. This inward flowing air diverts any particles of coating material traveling toward the upper portions of the container walls in the region of the passage 144, effectively "masking" this region to avoid deposit of a coating thereon.

In the operation of the embodiment shown in FIGURE 13, the projecting gun is generally retracted to the position 136a within the shield 138 at the end of each coating operation. The coated container 140 is removed and a new container 140 is placed in coating position as shown in FIGURE 13. The gun 136 then moves downward to its lower terminal position 136b and then returns to the retracted position 136a while continuously projecting the air-powder stream toward the inside surfaces of the container 140, after which the coated container is removed to complete the cycle. During this operation the shield 138 remains stationary in the position shown in FIGURE 13. By retracting projecting gun 136 into shield 138 during the changing of containers 140, the projected coating material is gathered and drawn away through the vacuum shield 138, minimizing waste. The container 140 is heated to allow the coating material to adhere and fuse on the coated surfaces while the vacuum shield 138 remains at a cooler temperature, below the melting point of the coating material, preventing deposit or build up of the coating material drawn away inside the vacuum shield 138.

Figure 14:
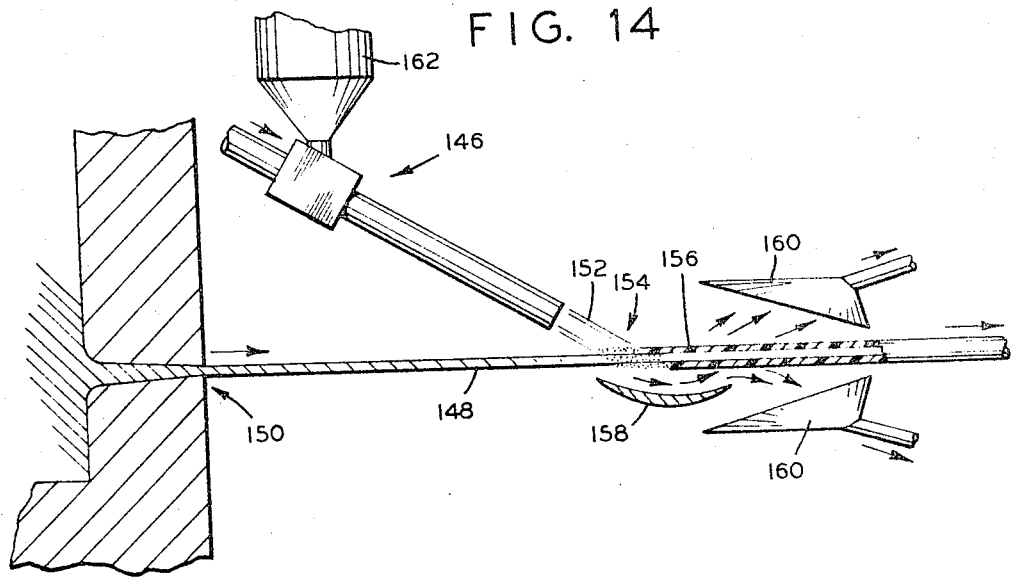
FIGURE 14 is a diagrammatic cross-sectional side elevation view of wire coating apparatus of the present invention.

Another embodiment of the invention is shown in FIGURE 14, where the projecting gun 146 is generally similar to that shown in FIGURES 4, 6 and 7. The gun 146 directs the laminar flowing stream of air and coating material 152 toward a newly extruded metal object 148, such as a wire or other extruded shape produced by the die 150. The stream 152 arrives at the extruded object 148 at the coating zone 154, producing the coating 156 thereon. The heat of the extruded material arising from the extruding operation or from preheating or melting is often sufficient to fuse the coating material at the point 154 without the application of additional heat. If desired, however, such heating means as a laser beam may be directed at the coating zone 154, or the laser beam may be directed at the coating stream 152 or the extruded object 148 or both to provide the heat required to fuse the coating material in the region 154 to form the desired coating 156.

A deflecting vane 158 placed in the path of the coating stream 152 on the opposite side of the extruded object 148 deflects the stream and redirects it toward this opposite side of the extruded object 148. This completes the coating uniformly around the periphery of the extruded object 148. Vacuum hoods 160 are positioned to collect and draw away the coating material leaving the coating region 154 after the coating 156 has been formed. These vacuum hoods are connected to the inlet of a suitable blower, which returns the collected coating material to a suitable supply, such as the hopper 162 supplying the projecting gun 146.

The various embodiments of the invention shown in the figures all employ the same coating process to produce the smooth and uniform coatings of this invention.

In its preferred form, this process involves the following principal steps:

(1) Mixing a dry powdered coating material into a flowing stream of compressed air or other gas, preferably in an expansion mixing chamber in which the velocity of the air is arrested rather abruptly at the point where the mixing occurs;

(2) Conducting the mixed stream of powder and compressed air down the length of a projecting tube or gun having flow-straightening means such as transverse screens positioned at intervals therealong, preferably with their principal axes parallel;

(3) Directing the mixed stream of powder and air issuing from the projecting gun toward the surface of the object to be coated;

(4) Supplying heat to melt the powdered coating material, whereby it adheres to the coated surface and fuses into a uniform coating thereon with sharply delineated edges;

(5) Positioning a vacuum hood or shield in close proximity to the stream of compressed air and powdered coating material in the vicinity of the object to be coated, to collect excess coating material and return it to the coating supply;

(6) Producing relative movement between the stream of coating material and the object to be coated, thereby providing an enlarged coating area having the same sharply delineated edges as the laminar flowing stream.

The temperature of the object to be coated is generally maintained at a point higher than the melting or fusing temperature of the coating material during the coating process, and it may be maintained at a high level for a time, to enhance the smoothness of the resulting coating. Alternatively, the dry particulate coating material may be heated above its melting temperature by passing it from the projecting gun through a flame, a laser beam, or a radiant heating zone as its moves toward the object to be coated.

An unexpected advantage of the expansion mixing chamber 56, shown in FIGURES 4 and 6, is the unusually large volume of powdered material which may be drawn into and carried by the stream of air. The arrested velocity of the air passing through the constricted passage 60 into the enlarged expansion mixing chamber 56 enhances the thoroughly mixing of powdered material entering through the passage 54. Thus up to a 2:1 volume ratio and up to a 60,000:1 or higher weight ratio of powdered solid material to compressed air may be introduced through powder feed passage 54 and mixed in the expansion mixing chamber 56 with compressed air entering through the constricted air feed passage 60. The converging powder feed passage 54 in conjunction with the constricted air feed passage 60 opening outward abruptly into the expansion mixing chamber 56 at the point of entrance of the powder feed passage 54 together comprise a most effective aspirator unit which acts as a vacuum pump having no moving parts. This aspirator may be used for moving powdered material, as in the present coating processes. It may also be used for quick pick up and sensitive timed release of paper sheets in printing press operations, for highly efficient chip removal in machine tool operations, and for many other uses in which partial vacuums or particulate material conveying operations are required.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. The method of coating specific surface areas of an object with solid powder particles of coating material capable of being fused upon a hot surface upon contact comprising, in combination, the steps of:
    (A) suspending the solid particles in an advancing stream of gas,
    (B) directing the advancing stream with the particles entrained therein through a plurality of longitudinally spaced apart transverse screen means, and producing in the gas stream substantially laminar flow characteristics, including
        substantially smooth, parallel, uninflected streamlines passing through and issuing from the screen means,
        with substantially equal pressures and particle velocities at laterally contiguous points of adjacent streamlines between the spaced apart screen means,
    (C) directing the issuing gas-powder stream to impinge upon a heated object positioned in the path of at least some of the uninflected streamlines issuing from the screen means, and
    (D) positioning a vacuum exhaust vent in the path of the gas-powder stream beyond the object to collect and recirculate unused powder coating material for re-use.

2. The method defined in claim 1 wherein the powder coating material is mixed into the advancing gas stream at a point of abrupt velocity reduction adjacent to the entrance of the conduit.

3. The method defined in claim 1 in which the widths of the apertures of said mesh screens are approximately ten times the average particle diameter of said finely divided coating material.

4. The method defined in claim 1 in which said mixed stream and said object are moved relative to each other, thereby providing an enlarged coated area on said object.

5. The process of applying a coating to the surface of an object comprising, in combination, the steps of:
    (A) mixing a dry powdered thermosettable coating material into a flowing stream of gas;
    (B) directing the advancing stream through a plurality of longitudinally spaced apart transverse screen means and thereby inducing substantially laminar flow in said mixed stream;
    (C) directing the mixed stream of powder and gas toward the surface of the object to be coated; and
    (D) supplying heat to melt the powdered coating material, whereby it adheres to the coated surface and fuses into a uniform coating thereon.

6. The process of applying a coating to the surface of an object comprising, in combination, the steps of:
    (A) mixing a dry powder thermosettable coating material into a flowing stream of compressed air in an enlarged expansion mixing chamber in which the velocity of the air is arrested abruptly at the point where the mixing occurs;
    (B) conducting the mixed stream of powder and compressed air through at least three flow-straightening transverse screens spaced apart and having their principal axes parallel, producing in the flowing air stream substantially laminar flow characteristics including
        substantially smooth, parallel, uninflected streamlines passing through the transverse screens,
        with substantially equal pressures and powder velocities at laterally contiguous points of adjacent streamlines,
    (C) directing the mixed stream of powder and compressed air toward the surface of the object to be coated;
    (D) supplying heat to melt the powder coating material, whereby it adheres to the surface of the object and fuses into a uniform coating thereon with sharply delineated edges; and
    (E) producing relative movement between the mixed stream of coating material and the object to be coated, thereby providing an enlarged coated area having sharply delineated edges corresponding to the edges of the laminar flowing stream.

References Cited by the Examiner
UNITED STATES PATENTS

| | | | |
|---|---|---|---|
| 1,791,624 | 2/1931 | Jessup | 117—18 |
| 1,826,776 | 10/1931 | Gunther | 239—432 X |
| 2,088,542 | 7/1937 | Westin | 118—301 X |
| 2,094,242 | 9/1937 | Parker | 117—18 |
| 2,336,946 | 12/1943 | Marden et al. | 118—308 X |
| 2,419,835 | 4/1947 | Hester | 118—312 |
| 2,514,107 | 7/1950 | Trostler | 239—343 X |
| 2,739,424 | 3/1956 | Fritze | 118—308 X |
| 2,770,212 | 11/1956 | Marantz | 118—312 X |
| 2,805,640 | 9/1957 | Davis et al. | 117—105.3 X |
| 2,817,310 | 12/1957 | Ponzini | 118—308 X |
| 2,859,728 | 11/1958 | Hobdy | 118—306 |
| 2,953,483 | 9/1960 | Torok | 117—38 X |
| 3,016,875 | 1/1962 | Ballentine et al. | 117—21 X |
| 3,100,724 | 8/1963 | Rocheville | 118—308 |
| 3,161,530 | 12/1964 | Strobel | 117—18 |

FOREIGN PATENTS

| | | |
|---|---|---|
| 1,137,732 | 1/1957 | France. |

WILLIAM D. MARTIN, *Primary Examiner.*

RICHARD D. NEVIUS, *Examiner.*

J. P. McINTOSH, S. W. ROTHSTEIN,
*Assistant Examiners.*